United States Patent

[11] 3,633,830

[72] Inventor Jakob Oberpriller
       Baierbrunn, Germany
[21] Appl. No. 823,809
[22] Filed May 12, 1969
[45] Patented Jan. 11, 1972
[73] Assignee Linde Aktiengesellschaft
       Wiesbaden, Germany
[32] Priority May 10, 1968
[33] Germany
[31] P 17 78 559.0

[54] PROCESS AND APPARATUS FOR THE COMMINUTION OF SOFT MATERIAL
28 Claims, 2 Drawing Figs.

[52] U.S. Cl. ................................................. 241/18
[51] Int. Cl. .................................................. B02c 11/08, B02c 21/00

[50] Field of Search ............................................ 241/15, 18, 27, 62–65, 48, 16

[56] References Cited
UNITED STATES PATENTS

| | | | |
|---|---|---|---|
| 2,879,005 | 3/1959 | Jarvis ........................... | 241/17 X |
| 2,919,862 | 1/1960 | Beike et al. ................... | 241/65 X |
| 3,241,774 | 3/1966 | Jackering ..................... | 241/16 |
| 2,609,150 | 9/1952 | Bludeau ....................... | 241/15 |

Primary Examiner—Othell M. Simpson
Attorney—Karl F. Ross

ABSTRACT: Process and apparatus for the comminution of pieces of relatively soft material, e.g., elastomers, synthetic resins, wherein the pieces of soft material are passed countercurrent to a circulating chilling-gas stream and into direct contact therewith to rigidify the pieces. Thereafter the rigidified pieces are milled prior to substantial warming thereof.

INVENTOR.
JAKOB OBERPRILLER
BY
Karl F. Ross
ATTORNEY

PROCESS AND APPARATUS FOR THE COMMINUTION OF SOFT MATERIAL

1. Field of the Invention

My present invention relates to a process and apparatus for the comminution of relatively soft materials and, more particularly, to the further subdivision or grinding of granules, pellets, particles or pieces of normally soft, extrudable, compressible, flexible or resilient materials such as thermoplastic synthetic resins or elastomers (synthetic or natural rubber).

2. Background of the Invention

It has heretofore been proposed to grind or otherwise comminute relatively soft materials such as thermoplastics, elastomers and the other materials mentioned above in order to form a powder or meal therefrom, for example, in the regeneration of plastic or elastomer compositions, by embrittling the pieces of the material and thereafter subjecting them to grinding by any conventional milling system.

The embrittlement or rigidification, usually by bringing the pieces of the material to be comminuted to a low temperature, was necessary since the soft pieces of thermoplastic synthetic resin or elastomeric material often squeezed between cooperating parts or milling machine or grinder, clogged the latter or otherwise failed to give rise to a uniform comminution.

At low temperatures, e.g., the cryogenic temperatures of liquid nitrogen, thermoplastic synthetic resins and elastomers such as natural and synthetic rubbers undergo an embrittling transformation, whereupon they become both stiff and brittle and can be ground, crushed, milled or pulverized with relative ease.

In conventional systems operating under these principles, pieces of the thermoplastic material or elastomer are passed through a preliminary cooling chamber containing a liquid bath and are rigidified by cooling therein, whereupon the pieces of the material are transferred by a conveyor screw through a liquefied gas at low temperature and brought into a comminution chamber.

A disadvantage of such systems is that it is practically not possible to control the cooling temperature which must remain more or less fixed at the boiling point of the liquefied gas. When it is desired to use somewhat different temperatures, therefore, it is necessary to change the liquid. Furthermore, there is a tendency for some of the low-temperature liquefied gas to reach the comminution chamber and suddenly cool the parts thereof thereby giving rise to breakdown resulting from the low-temperature embrittlement of the comminution machinery. Additionally, the fact that the conveyor worm or screw must interconnect chambers of extremely high temperature differences, subjects this conveyor to considerable thermal shock and stress and leads to early breakdown.

OBJECTS OF THE INVENTION

It is, therefore, the principal object of the present invention to provide a process for the comminution of relatively soft, extrudable or ductile materials in which the aforementioned disadvantages are obviated and which can be carried out with relative ease and without substantial danger to the equipment used.

Another object of this invention is the provision of an apparatus for comminuting such materials which is of relatively low cost, which is less prone to breakdown than earlier systems, which enables various cooling temperatures to be used, and which yields fine uniform comminuted products.

SUMMARY OF THE INVENTION

These objects and others are attained in accordance with the present invention by a system which depends upon the use, as an essential feature, of a countermoving gas stream through which the relatively soft material to be comminuted is displaced and cooled to the point of rigidification or embrittlement. Thus the present invention provides that the goods or material to be comminuted is chilled in passing countercurrent to a circulated chilling-gas stream prior to passage into the comminution chamber.

According to this invention, the material to be comminuted is passed along a cooling column or stretch of minumum length and of high throughput of the goods to be comminuted. The system also embrittles the comminutable material to be brought to any desired temperature, solely by adjustment of the quantity and temperature of the cooling gases. Perhaps the most significant advantage of the present invention is that it permits the apparatus to be used for the processing of materials of different compositions and physical properties and eliminates the need for separate cooling arrangements for the different materials.

A feature of the present invention resides in the divergence of a portion of the circulating gas stream, withdrawal from the warm side of the cooling tower or column from the remainder of the stream and filtering this portion to prevent the build up of fine particles, dust and the like in the circulating cooling gas. For the recooling of the circulating gas, I provide a bypass for a portion of the cooling gas stream, preferably a fraction thereof, and pass this portion of the cooling gas stream in heat-exchanging relationship with a liquefied gas, a part of which, i.e., the portion vaporized in heat exchange with the recirculating gas, to enter the gas-circulating system. Various cooling techniques can, however, be used in accordance with the present invention and it will be understood that general statements with respect to recooling of the gas after the chilling of the soft material should be considered as including all of these techniques. They are, however, highly preferred over others which may become apparent to those skilled in the art.

For instance, I have already referred to the passage of the recirculating portion of the chilling gas in heat-exchanging relationship to a cooling medium in the form of liquefied gases at low temperature (e.g., liquid nitrogen), preferably by passing the recirculating gas through a coil immersed in a bath of the liquefied gas. Alternatively, a liquefied gas can be injected into the recirculating gas stream so that it expands from the liquid to the vapor state and thereby not only absorbs latent heat of vaporization from the recirculating gas but also transfers sensible heat from the latter in direct heat exchange.

Cold vapors, derived from a bath of liquefied gas, may alternatively or together with either of the aforementioned techniques, be mixed with the recirculating gas. In these systems, the chilling-gas temperature as well as the quantity of chilling gas to which the comminutable material is exposed can be controlled within relatively wide ranges by circulation of the addition of liquefied gas to the chilling-gas stream.

According to a further feature of the invention, at least a portion of the chilling gas, which has been warmed by heat exchange with the comminutable material, is still very dry and is used in a pretreatment of the comminutable material, prior to chilling of the latter, to remove moisture from this material. The moisture content of the material to be comminuted can thus be maintained constant and minimal and an introduction of moist gas or the warm moist atmospheric air, excluded by the pretreatment gas, into the chilling-gas recirculating stream is precluded.

Yet another feature of this invention resides in the displacement at least in part, and preferably completely, of the comminutable chilled material to the comminuting station in a transport-gas stream which is circulated through the comminution stage. To prevent excessive withdrawal of the chilling gas from the prior stage, I maintain the secondary gas circulation of the transport gas such as to minimize the gas pressure drop across the two stages.

The transport gas is preferably passed through a filter during its circulation through the second or comminuting stage of this system to prevent accumulation of dust in the recirculating fluid and limit the escape of dust through the comminution devices and the like.

Since the transport gas is warmed during the comminution of the chilled material, it is preferred to provide means for cooling the transport gas, by introducing a cooling arrangement in the circulation path of the transport gas and/or by introducing a quantity of cold fluid into this circulation path. It is then possible to maintain the temperature in the comminuting stage substantially constant and thereby prevent large temperature variations and the thermal stress caused thereby. In addition, there is no danger that the comminutable goods will be heated on passage through the second stage to a level at which they would loose their rigidity and comminutability.

For maintaining the temperature in the comminuting stage substantially constant by dissipating heat generated during comminution or pickup by recirculation of the transport gas, a portion of the transport gas may be diverted from the recycling path, introduced into the cooling cycle for chilling thereby and a corresponding quantity restored to the transport-gas cycle at a reduced temperature. Prior to cooling of this withdrawn fraction, it is preferably filtered to prevent the introduction of dust particles and the like into the cooling-gas cycle. It will also be understood that, on occasion, the temperature at the comminution stage tends to lower usually as a consequence of the leakage of cold from the chilling stage to the comminution stage. To counteract this temperature variation, heating means may be provided in the transport-gas circulating path to counteract excessive cooling.

The apparatus for carrying out the process of the present invention preferably comprises a chilling tower or duct in which a vertical downward movement of the comminutable material is sustained, countercurrent to the rising stream of circulating chilling fluid. At the upper end of the chilling tower or stage, the stack may have a pretreatment portion of relatively large cross section, i.e., a cross section in excess of that of the chilling section therebelow, while means is provided for circulating the entire chilling-gas stream through this lower portion of reduced flow cross section. As a consequence of the relationship between the sizes of these sections and higher flow rate of cooling gas induced through the chilling portion of the column, only a minor proportion of the chilling gas, warmed by passage countercurrent to the comminutable material, enters the upper or pretreatment portion of the stack to pass countercurrent to the material descending therein. This fraction of the chilling stream acts as a drying medium for reducing the moisture content of descending material. Since the upper compartment of the stack has a larger cross section than the lower compartment, the velocity of gas entering the upper compartment falls off substantially and prevents entrainment of substantial quantities of particulate matter with the gas stream entering the upper compartment.

In the region of the lower compartment and of the chilling column, I prefer to provide a precomminuting device, a dispensing arrangement or a feeding system for metering the chilled material from the chilling compartment to the main comminuting stage. During this process, the chilled product may be partly broken up to facilitate entrainment by the transport gas.

According to still another feature of my invention, a perforated chilling-gas duct is provided at the bottom end of the chilling compartment for injecting the chilling-gas upwardly and centrally into the latter beneath the precomminuting, metering or feed device, the duct extending substantially uniformly over the cross section of the outlet of this chilling chamber to insure uniform distribution of the chilling gas. To convey the chilling gas in a closed cycle, an upper perforated tube may be provided substantially at the enlargement of the stack leading from the upper end of the chilling compartment into the precooling and drying compartment, a gas circulation blower being provided in a line connecting the perforated pipes. Between this blower and the perforated inlet pipe at the upper end of the chilling compartment, I provide a filter to remove particulate matter which may be entrained in the recirculated gas.

The cooling of the chilling-gas, which has been warmed upon passage upwardly through the stack, can be effected through a looped pipe immersed in a vessel containing liquified gas at a temperature of approximately its boiling point, e.g., the cryogenic temperatures of the boiling point of liquid nitrogen. Above the bath of liquefied gas, I provide a gas-collecting space which leads into the chilling-gas recirculating system so that gas formed by vaporization of the liquid of the bath, upon the transfer of sensible heat of the recirculated chilling fluid through the loops and the heat-exchange tube, may enter the cooling cycle. A bypass may also be provided for the heat-exchange loop, together with control means for regulating the proportion of chilling fluid bypassed, the bypassed quantity being mixed with the quantity led to the heat-exchange tube and any vaporized gas from the bath downstream from the latter. A valve means permitting control of the proportion of bypassed gas will of course, provide an accurate regulation of the chilling gas temperature upon its entry to the chilling chamber at the perforated plate below the outlet of the latter.

Still another feature of this invention resides in the provision of a filter assembly in the transport-gas circulating path, the filter assembly including an upright, elongated filter vessel containing a filter bag through which the transport gas is passed generally upwardly and from the interior to the exterior. A cooling device may be provided around the bag to prevent undesirable rise in the temperature of the transport gas returned to the comminuting stage, this cooling device having the advantage that its provision and the filter arrangement provides a relatively large heat-exchange surface area and, correspondingly, a high-cooling efficiency.

DESCRIPTION OF THE DRAWING

The above and other objects, features and advantages of the present invention will be more readily apparent from the following description, reference being made to the accompanying drawing in which.

SPECIFIC DESCRIPTION

Figure 1:
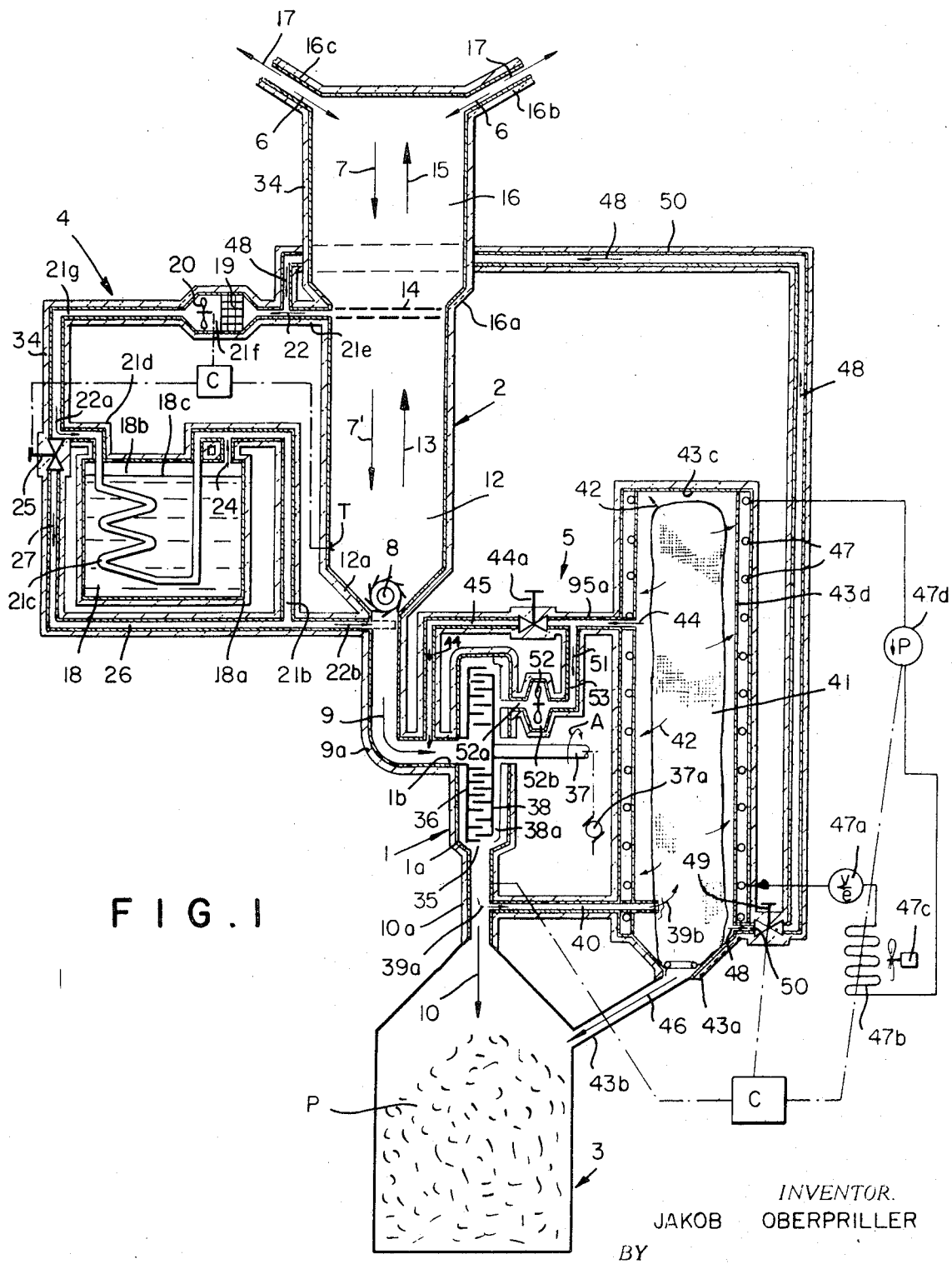
FIG. 1 is a diagrammatic cross-sectional view through a system for the comminuting of soft, elastic and extrudable material, e.g., elastomers, according to the present invention, the apparatus being shown in diagrammatic form.

The apparatus illustrated in FIG. 1 basically comprises a main comminuting stage 1 constituted by a pinned-disk mill whose shaft 37 is driven by a motor 37a in the direction of arrow A (counterclockwise as viewed from the left in FIG. 1) which is fed with chilled and embrittled, precomminuted pieces of the soft material from a cooling tower 2. The finely comminuted material, e.g., a pulverized mass or powder P, is collected in a vessel 3 downstream of the pinned mill 1. The apparatus basically comprises a cooling or chilling-gas circulating system, generally represented at 4, and a transport-gas circulating system generally represented at 5. A duct 9a connects the chilling tower 2 with the main comminuting stage, while a duct 10a connects the main comminuting stage with the collecting vessel 3.

The chilling tower 2 has a chilling compartment 12 of relatively small flow cross section and is provided with a downwardly converging frustoconical funnel 12a opening an outlet or bottom, into the duct 9a and receiving close to the outlet 12b a precomminution or metering drum 8. The latter may be of the type described at pages 7–31 —7–33 of Perry's Chemical Engineers' Handbook, Fourth Edition, McGraw-Hill Book Company, N.Y., or the feed crusher of page 8–33 thereof. At its upper end, the chilling compartment 12 widens at 16a into a drying compartment 16 of larger flow cross section which has ducts 16b and 16c communicating therewith to introduce the soft material to be chilled.

The cooling cycle comprises a perforated outlet pipe 12b located at the outlet 12b of compartment 12 beneath the rotary precrusher and feed member 8 which communicates with a mixing duct designated by arrow 22b. Cold gas is supplied to this duct via a line 21b after passing through a heat-exchange loop 21c immersed in a bath 18 of liquefied gas (e.g., liquid nitrogen).

The bath 18 is received in a vessel 18a, the upper portion of which forms a collecting space 18b for gas vaporized from the bath 18, the vapor being led from the space 18b via duct 23 into line 21b. A level-responsive device 18c maintains the liquid level of bath 18 constant. The other pipe leading into duct 21 is a bypass 26 extending from a valve 25 at which a branch 21d leads part of the recycled chilling gas through the heat-exchanger loop 21c.

The perforated inlet pipe 14 at the upper end of chilling compartment 12 communicates with a duct 21e leading to a filter chamber 21g containing a particle-trapping filter 19 and a blower 20 which circulates the chilling gas and sprays the warmed gas via line 21g to the valve 25 and the heat-exchanger loop 21c. The operation of the cooling cycle 4 will be described in greater detail hereinafter.

The main comminuting stage 1 comprises a pair of pinned disks 36 and 38, in a housing 1a, the disk 36 being fixed and the disk 37 being rotatable as represented by A by the motor 37a. The pinned-disk mill 1 may be of the type described at pages 8–40 ff. of *Perry's Chemical Engineers' Handbook*, cited earlier.

The precomminuted chilled material may be led into the interior of the pinned disk 36, 38 by duct 9a leading from the outlet 12b to the inlet 1b of the housing 1a. The outlet 35 of this housing opens downwardly into the duct 10a which communicates with the receptacle 3.

The transport-gas circulation can be induced by a blower 52 whose intake side 52a communicates with the interior of housing 1a of the pinned-disk mill while its inlet side 52b communicates via a duct 53 with a line 45 provided with an adjustable throttle valve 44a controlling the proportion of the transport gas bypassed across the main comminuting stage 1.

The blower 52 draws gas from the filter assembly 43 which is vertically elongated and has a hopper 43a at its bottom through which recovered particles can be delivered to the vessel 3 via a chute 43b.

Within the interior of the filter housing 43, I provide a vertically elongated filter bag 41 to which the transport gas may be fed via a duct 40, close to the base of the filter bag. At an upper location therealong, the gas drawn from the space 43c surrounding the filter bag is delivered to line 53 via a branch 95a of the duct 45.

The interior of the filter housing 43 is lined with a thermally conductive wall 43d spaced from the wall of housing 43 so that cooling (or heating) coils 47 can be provided in the interwall space. A refrigeration system including an expansion valve 47a, a heat-dissipating radiator 47b provided with a fan 47c, and a compressor 47d may be used to maintain the temperature within the filter substantially constant. In addition, I provide a bypass 50, containing a control valve 49, between the filter 43 and the chilling-gas circulating system 4.

Figure 2:
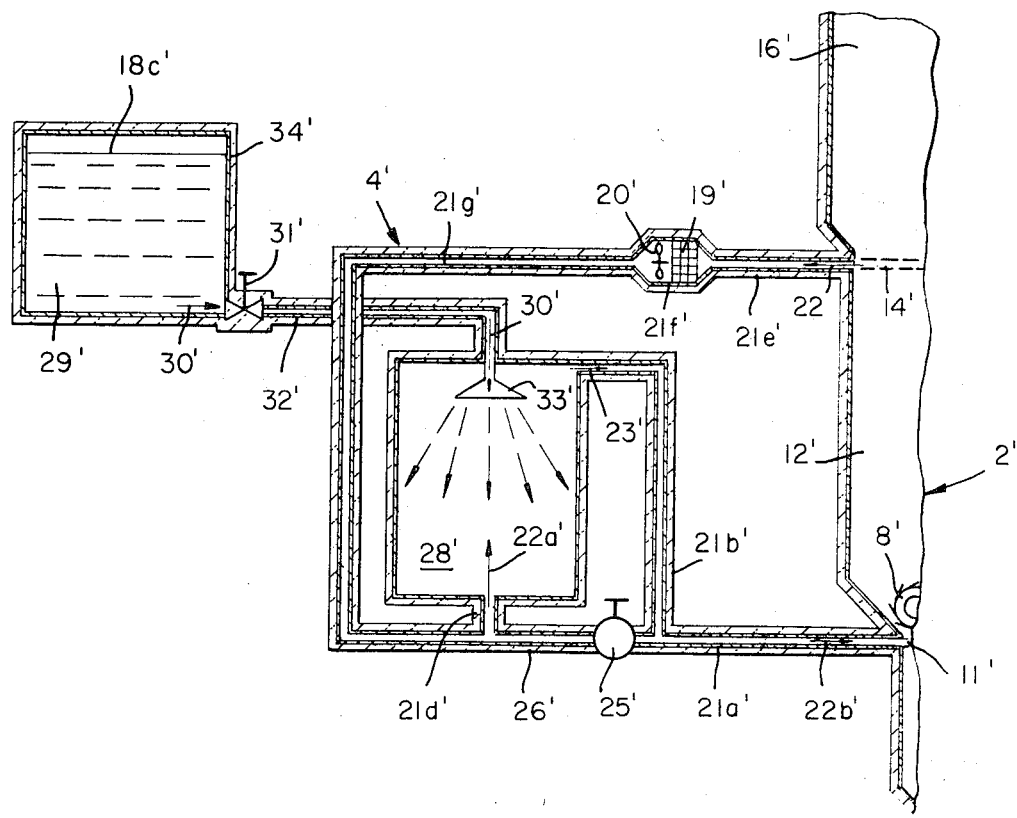
FIG. 2 is a fragmentary view similar to FIG. 1, of another embodiment of the invention.

In the modification of FIG. 2, cooling is effected by spraying a liquefied gas through the nozzles 33' into the cooling chamber 28' to which the recycled gas from the chilling chamber 12' can be introduced via a branch 21d'. A valve 25' controls the quantity of chilling gas permitted to enter the chamber 28. The liquefied gas is maintained in a bath 29' at a constant level (via control 18c') in a storage vessel 34' and is led via a valve 31' and a pipe 32' to the duct 30' of the spray nozzle. The cold-gas circulating system 4' here includes the inlet pipe 14' at the upper end of chilling chamber 12' and the lower end of the precooling and drying chamber 16' which delivers the slightly warmed chilling gas via line 21e' to a filter housing 21f' containing the filter 19' and the blower 20. The recirculated gas is led via line 21g' to the branch 21d' and the bypass 26'. From the chamber 28', the cold portion of the chilling gas is delivered by line 21b to the mixing duct 21a' and thence to the perforated outlet pipe 11' at the bottom of the chilling chamber 12' below the precomminuting device 8' of the stack 2'.

OPERATION

The soft and normally not readily comminutable material is fed in relatively large chunks to the chilling stack via the drying chamber 16 at the upper end of the latter as indicated by arrows 6, the material passing downwardly through the drying chamber 16 as represented by arrow 7. Within the chamber 16, the chunks of material are subjected to direct contact with a dry cool gas (warmed previously) rising from the chilling compartment 12 as will be discussed in greater detail hereinafter. Upon passage into the chilling chamber 12, the chunks of soft material move generally in the direction of arrow 7', i.e., downwardly, and are chilled to the point of embrittlement or rigidification so that, at the bottom of this chamber 12, they may be broken up by the precomminuting and feed device 8 into granules which pass in the direction of arrow 9 to the pinned-disk mill 1, wherein the granules are milled to a fine powder which cascades in the direction of arrow 10 into the receptacle 3.

The chilling gas from the perforated tube 11 passes uniformly upwardly through the outlet 12b of chamber 12, countercurrent to the descending mass of comminutable chunks as shown by arrow 13, thereby chilling the latter. The major portion of the chilling gas, slightly warmed, is drawn in through the perforations of pipe 14 at the upper end of the chilling chamber 12 by the blower 20 and is recycled at 4. The remainder of the chilling gas, partially warmed, from compartment 12, passes upwardly (arrow 15) at a reduced velocity through compartment 16 of the stack to precool and dry the descending stream of comminutable goods and emerges from the stack through the ducts 16b and 16c as represented by arrows 17. The emerging gases form a gas lock which prevents the flow of warm moist atmospheric air into the comminuting installation.

As described previously, the larger cross section of the drying compartment 16 of the stack 2 causes a reduction in velocity of the gas emerging into this compartment (arrow 15) so that any entrained particles are sedimented and fall via the funnel 16a into the chilling compartment 12 and are eventually carried to the pinned-disk mill 1 for further comminution. The sensible heat taken up by the gas circulation in the direction of arrow 22 through the cooling cycle 4 is dissipated by bypassing a portion of this gas (arrow 22a) through the heat-exchange loop 21c while the balance of the gas, as controlled by valve 25, is permitted to flow along the bypass 26, as represented by arrow 27. The heat content of the portion of the gas passing through the heat-exchange loop 21c is transferred to the bath 18 of liquefied gas and vaporizes a portion of the latter into the compartment 18b above this bath, the vaporized portion joining the now-cooled gas as represented by arrow 24 and meeting the bypass gas stream (arrow 22b) following through the mixing duct 21a to the perforated pipe 11. The valve 25 thus readily controls the temperatures of the chilling gas introduced into the compartment 12. It should be noted that the flow-inducing rate of blower 20 may also be modified as desired to vary the quantity of gas introduced into the chilling compartment 12 and thus the cooling rate.

In the modification of FIG. 2, which is provided with compartments 16', 12', etc., as described in connection with FIG. 1, the recycled chilling gas is drawn through the cooling cycle 4' as represented by the arrow 22' and a portion of this gas is introduced as represented by arrow 22a' into the compartment 28' wherein it transfers its sensible heat to the expanding liquefied gas of nozzle 33' which absorbs this heat as latent heat of vaporization, the resulting vapor contributing to the cold gas returned at 23' to the mixing duct 21a' from which the cold gas passes at 22b' into the chilling chamber 12'. The liquefied gas flows from the vessel 34' as represented by arrow 3' into the nozzle 33' at a rate determined by valve 31' which, together with valve 25', permits accurate adjustment of the temperature of the gas introduced into the chilling compartment 12'. The cooling cycle ducts, vessels and valve arrangements are, according to the present invention, provided with thermally insulating jackets 34 and 34' to limit absorption of heat from the atmosphere.

Within the pinned-disk mill 1, the precomminuted brittle material enters the spiral housing 35 and is sheared between the fixed pinned disk 36 and the rotatable pinned disk 38. To convey the brittle material through and into the pinned-disk mill, the transport gas, which may be nitrogen and is also at a low temperature, is drawn from the pinned mill as represented by arrow 39a, introduced into the filter bag 41 (arrow 39b) and thereafter permitted to enter the space surrounding this filter bag (arrows 42). In this space any increase in temperature of the transport gas is removed by heat exchange with the refrigeration tubes 47 so that a gas at constant low temperature passes at 44 into the duct 45a through which it is drawn by a blower 52 in the direction of arrow 51 and injected into the pinned mill. The particles caught by filter 41 drop via chute 43b into receptacle 3 as represented by arrow 46.

In the event of a sudden rise in the temperature of the transport gas or the existence of an excessively high transport-gas temperature, e.g., as may exist at the beginning of operations, I provide means for rapidly reducing the temperature of the transport gas in the form of the pipe 50 connecting the filter 43 with the cooling cycle 4. Thus a portion of the filtered transport gas may be removed from the filter 43 (arrow 48) at a rate controlled by the valve 49 and introduced into the cooling cycle 4 at duct 21e. Assuming a constant rate of operation of the blower 52, a corresponding quantity of chilled gas will be drawn from the perforated pipe 11 via duct 9a through the pinned mill 1 and into the filter 43 as represented b arrows 39a and 39b, thereby rapidly reducing the temperature of the transport gas.

A portion of the filtered transport gas, admitted as shown by arrow 51 to the blower 52, is forced by the latter through the chilling gap between the housing of the pinned-disk mill 1 and its driven disk 38, this gap being represented at 38a. This stream of gas prevents particles of the comminuted material from reaching the bearing of shaft 37 and prevents escape of dust into the atmosphere. The valve 44a also permits a portion of the transport gas to flow in the direction of arrow 44 and assists in the entrainment of the precomminuted material into the pinned mill. A sensor may be provided in duct 10a to respond to the heating of the transport gas to control via any conventional circuitry C, the refrigerating unit for the filter 43 or the valve 49, thereby automatically regulating the temperature of the transport gas. Similarly, a sensor at T in compartment 12 may control the blower 20 and the valve 25 to regulate the chilling temperature via the control unit C'.

I claim:

1. A process for the comminution of pieces of relatively soft material, comprising the steps of:
   passing the pieces of said soft material countercurrent to a chilling-gas stream and into direct contact therewith to rigidify said pieces;
   recirculating at least part of said stream after its contact with said material into contact with further quantities of the material;
   thereafter milling the rigidified pieces prior to substantial warming thereof; and
   filtering at least a portion of the chilling-gas stream prior to its recirculation into contact with such pieces.

2. A process for the comminution of pieces of:
   relatively soft material, comprising the steps of:
   passing the pieces of said soft material countercurrent to a chilling-gas stream and into direct contact therewith to rigidify said pieces;
   recirculating at least part of said stream after its contact with said material into contact with further quantities of the material;
   thereafter milling the rigidified pieces prior to substantial warming thereof; and
   cooling at least a portion of the recirculated chilling-gas stream by heat exchange with low-temperature liquefied gas, prior to returning the recirculated stream to contact with said pieces.

3. The process defined in claim 2 wherein said portion of said stream is cooled by injecting into same a spray of liquefied gas, vapors of said liquefied gas being thereafter entrained as part of said chilling-gas stream.

4. The process defined in claim 2 wherein said portion of said stream is cooled by passing it in indirect heat exchange with a bath of said liquefied gas, thereby transferring sensible heat to said bath.

5. The process defined in claim 4, further comprising the step of vaporizing a portion of the liquefied gas with the heat transferred to said bath and combining the vapors of the liquefied gas thus resulting with the stream recirculated into contact with said pieces.

6. The process defined in claim 2, further comprising the step of drying said pieces of soft material with a portion of said chilling-gas stream after warming of said portion by absorption of heat from the pieces of said material contacted thereby.

7. A process for the comminution of pieces of relatively soft material, comprising the steps of:
   passing the pieces of said soft material countercurrent to a chilling-gas stream and into direct contact therewith to rigidify said pieces;
   recirculating at least part of said stream after its contact with said material into contact with further quantities of the material;
   thereafter milling the rigidified pieces prior to substantial warming thereof; and
   entraining the rigidified pieces to the milling step and carrying the milled product from the zone in which it is milled in a recirculating transport-gas stream.

8. The process defined in claim 7, further comprising the step of filtering said recirculating transport-gas stream prior to its return to said milling stage.

9. The process defined in claim 8 wherein said pieces are milled with a rotary member, said process further comprising the step of sealing said member against the escape of particles to the atmosphere with at least a portion of the recirculated filtered transport-gas stream.

10. The process defined in claim 7, further comprising the step of maintaining the temperature of said transport-gas stream substantially constant at least at entry of said transport-gas stream to the milling zone.

11. The process defined in claim 7, further comprising the step of cooling said transport gas stream by diverting a portion of said transport gas stream from the recirculating path, combining said portion with said chilling-gas stream and drawing part of the chilling-gas stream into said transport -gas stream.

12. An installation for the comminution of pieces of relatively soft material, comprising:
   means forming a chilling chamber adapted to receive pieces of soft material for displacement therein in one direction;
   circulating means for recirculating a chilling-gas stream through said chamber countercurrent to the movement of said pieces therethrough and in direct heat exchange with said pieces, thereby cooling said pieces and rigidifying same; and
   milling means connected to said chamber for connecting the rigidified pieces prior to substantial warming thereof; said means forming said chilling chamber being an upright column having a drying chamber at an upper portion thereof and said chilling chamber below said drying chamber, said pieces passing downwardly through said chambers in succession, said drying chamber having a larger cross section than said chilling chamber, said circulating means including outlet means at the bottom portion of said chilling chamber and drawing partially warm chilling gas from said chilling chamber, respectively.

13. An installation as defined in claim 12, further comprising precomminuting means at the bottom of said chilling chamber for reducing the size of the rigidified pieces prior to the passage thereof to said milling means, and a duct connecting the bottom of said chilling chamber with said milling means for conveying precomminuted pieces of the rigidified material thereto.

14. An installation as defined in claim 12 wherein said outlet means includes a perforated pipe opening upwardly and centrally into said chilling chamber below said precomminuting means.

15. An installation as defined in claim 12 wherein said circulating means includes blower means interconnecting said inlet means and said outlet means for displacing said chilling-gas stream along a closed path, and filter means between said blower means and said inlet means for removing particles entrained with said partially warmed chilling gas.

16. An installation as defined in claim 15, further comprising means along said path for cooling at least part of the recirculated chilling-gas stream prior to its return to said outlet means in heat-exchange with a liquefied gas.

17. An installation as defined in claim 16 wherein the means for cooling said part of said recirculated chilling-gas stream includes means for injecting liquefied gas into said stream.

18. An installation as defined in claim 16 wherein the means for cooling said part of said chilling-gas stream includes a bath of liquefied gas, and a heat-exchange loop extending into said bath for passing said part of said chilling-gas stream through said loop into heat exchange with the liquefied gas of said bath to transfer sensible heat to said bath.

19. An installation as defined in claim 18 wherein said sensible heat transfer to said bath vaporizes a portion of said liquefied gas, further comprising means for combining the vapors of said liquefied gas with said part of the chilling-gas stream passed through said loop.

20. An installation as defined in claim 16, further comprising means for controlling the temperature of the chilling-gas stream admitted to said chilling chamber and including means for selectively establishing the proportion of the recirculated chilling-gas stream subjected to cooling with said liquefied gas.

21. An installation for the comminution of pieces of relatively soft material, comprising:
  means forming a chilling chamber adapted to receive pieces of soft material for displacement therein in one direction;
  circulating means for recirculating a chilling-gas stream through said chamber countercurrent to the movement of said pieces therethrough and in direct heat exchange with said pieces, thereby cooling said pieces and rigidifying same;
  milling means connected to said chamber for connecting the rigidified pieces prior to substantial warming thereof; and
  means for recirculating a transport-gas stream through said milling means for conveying rigidified pieces of said material to said milling means and carrying the milled product away from said milling means, said milling means including a pinned-disk mill connected with said chilling chamber, and a collecting receptacle connected with said mill for accumulating the milled product, said means for recirculating said transport-gas stream including means forming a closed circulating path provided with a blower and a filter upstream of said blower for removing particles entrained with the transport gas prior to the passage of the transport gas through said blower.

22. An installation as defined in claim 21, further comprising temperature-control means in said filter for maintaining the temperature of said transport-gas stream substantially constant at least upon entry of the transport gas into said mill.

23. An installation as defined in claim 22 wherein said temperature-control means includes refrigerator means in said filter.

24. An installation as defined in claim 21 wherein said mill has a housing for at least one rotary member journaled in said housing, said blower being constructed and arranged to introduce said transport gas between said rotary member and said housing at a pressure and velocity sufficient to prevent escape of dust from said mill to the atmosphere.

25. An installation as defined in claim 21 further comprising conduit means connecting said path with the circulating means for recirculating said chilling-gas stream to permit transfer of gas between said streams.

26. An installation as defined in claim 25 wherein said conduit means includes a duct connected with said filter and a valve in said duct controlling the transfer of gas between said streams.

27. An installation as defined in claim 21, further comprising a duct connecting said chilling chamber with said mill, and means including a valve connecting the circulating path of said transport gas stream with said duct.

28. A process for the comminution of pieces of relatively soft material, comprising the steps of:
  a. passing the pieces of said soft material in direct contact with and countercurrent to a circulating chilling-gas stream to rigidify said pieces;
  b. branching off at least part of this circulating chilling-gas stream after a substantial warming thereof from abstraction of heat from said pieces;
  c. cooling the branched portion of said chilling-gas stream and returning the cooled portion to said circulating chilling-gas stream for contact with additional pieces of said soft material in accordance with step (a); and
  d. milling the rigidified pieces prior to substantial warming thereof.

* * * * *